(12) United States Patent
Jeong

(10) Patent No.: US 9,618,695 B2
(45) Date of Patent: Apr. 11, 2017

(54) OPTICAL SIGNAL PROCESSING APPARATUS USING PLANAR LIGHTWAVE CIRCUIT WITH WAVEGUIDE-ARRAY STRUCTURE

(71) Applicant: ELECTRONICS AND TELECOMMUNICATIONS RESEARCH INSTITUTE, Daejeon (KR)

(72) Inventor: Jong Sool Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/174,958

(22) Filed: Jun. 6, 2016

(65) Prior Publication Data

US 2017/0010415 A1    Jan. 12, 2017

(30) Foreign Application Priority Data

Jul. 9, 2015    (KR) .................. 10-2015-0097738

(51) Int. Cl.
G02B 6/12    (2006.01)
G02B 6/32    (2006.01)
(Continued)

(52) U.S. Cl.
CPC ..... *G02B 6/12019* (2013.01); *G02B 6/12033* (2013.01); *G02B 6/32* (2013.01);
(Continued)

(58) Field of Classification Search
CPC .. G02B 6/12019; G02B 6/3596; G02B 6/353; G02B 6/4286; G02B 6/12033; G02B 6/32; G02B 6/3504; H04J 14/02
See application file for complete search history.

(56) References Cited

U.S. PATENT DOCUMENTS 6,965,717 B1 *  11/2005  Tabuchi ............. G02B 6/12019
                                                    359/565
7,103,244 B2 *  9/2006   Chen ................. G02B 6/12007
                                                    385/140
(Continued)

OTHER PUBLICATIONS

Richard A. Crocombe et al., "Micro-optical instrumentation for process spectroscopy", Proc. of SPIE, vol. 5591, pp. 11-25, Dec. 8, 2004.

(Continued)

*Primary Examiner* — Ryan Lepisto
(74) *Attorney, Agent, or Firm* — Rabin & Berdo, P.C.

(57) ABSTRACT

An optical signal processing apparatus using a planar lightwave circuit (PLC) with a waveguide-array structure includes a PLC board including a waveguide-array structure, a cylinder lens for collimating optical signals emitted and output from the PLC board into parallel beams, a condenser lens for condensing, for each channel, optical signals output by passing through the cylinder lens, and a light receiving element for receiving optical signals condensed on at least one channel from the condenser lens and converting the optical signals into electrical signals, wherein the PLC board divides an optical signal input thereto into a plurality of different optical signals and outputs the optical signals at different propagation angles.

13 Claims, 4 Drawing Sheets

(51) Int. Cl.
G02B 6/35 (2006.01)
G02B 6/42 (2006.01)
H04J 14/02 (2006.01)

(52) U.S. Cl.
CPC ............ *G02B 6/353* (2013.01); *G02B 6/3504* (2013.01); *G02B 6/3596* (2013.01); *G02B 6/4286* (2013.01); *H04J 14/02* (2013.01)

(56) References Cited

U.S. PATENT DOCUMENTS

| | | |
|---|---|---|
| 7,463,828 B2 | 12/2008 | Moon et al. |
| 8,009,272 B2 * | 8/2011 | Ohkubo .............. G03F 7/70666 355/53 |
| 2002/0113281 A1 * | 8/2002 | Cunningham ........ B81B 3/0051 257/415 |
| 2007/0002429 A1 | 1/2007 | Kamei et al. |
| 2010/0119231 A1 | 5/2010 | Kim et al. |
| 2010/0296776 A1 | 11/2010 | Ishii et al. |
| 2014/0086531 A1 | 3/2014 | Park et al. |

OTHER PUBLICATIONS

J. Berger et al., "Widely Tunable, Narrow Optical Bandpass Gaussian Filter Using a Silicon Microactuator", OSA/OFC, vol. 1, pp. 252-253, 2003.

* cited by examiner

OPTICAL SIGNAL PROCESSING APPARATUS USING PLANAR LIGHTWAVE CIRCUIT WITH WAVEGUIDE-ARRAY STRUCTURE

CROSS-REFERENCE TO RELATED APPLICATION

The present application claims priority to Korean patent application number 10-2015-0097738 filed on Jul. 9, 2015, the entire disclosure of which is incorporated herein in its entirety by reference.

BACKGROUND

1. Field

An aspect of the present disclosure relates to an optical signal processing apparatus using a planar lightwave circuit with a waveguide-array structure.

2. Description of the Related Art

An optical channel monitor (OCM) monitors the intensity, wavelength, etc. of a wavelength division multiplexing (WDM) optical signal (hereinafter, referred to as a WDM optical signal) input or output from a node of a metro or long-distance network. The OCM monitoring the WDM optical signal is commercialized based on various techniques in many companies (JDSU, Finisar, Axsun, DiCon, LambdaQuest, Photop, Optoplex, etc.).

A technique using an optical resonance structure-based wavelength-tunable optical filter and a technique using diffraction grating are representative of techniques for implementing the OCM. When the wavelength-tunable optical filter is used, a technique for accurately controlling the length of an optical resonance structure using MEMS is required. When the diffraction grating is used, the OCM is configured with bulk-type optical components. Hence, a technique for accurately aligning and assembling optical components is required, and the size of the OCM increases.

As described above, the typical technique for implementing the OCM is restrictively applied to a metro or long-distance optical communication system in terms of price and size. In addition, a minority of companies has monopolized the technique due to its very high accuracy and complexity.

SUMMARY

Embodiments provide an optical signal processing apparatus using a planar lightwave circuit with a waveguide-array structure, which can monitor intensity and a wavelength of a WDM optical signal for each channel.

According to an aspect of the present disclosure, there is provided an optical signal processing apparatus including: a planar lightwave circuit (PLC) board configured to include a waveguide-array structure; a cylinder lens configured to collimate optical signals emitted and output from the PLC board into parallel beams; a condenser lens configured to condense, for each channel, optical signals output by passing through the cylinder lens; and a light receiving element configured to receive optical signals condensed on at least one channel from the condenser lens and convert the optical signals into electrical signals, wherein the PLC board divides an optical signal input thereto into a plurality of different optical signals and outputs the optical signals at different propagation angles.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The present disclosure now will be described more fully hereinafter with reference to the accompanying drawings, in which embodiments of the present disclosure are shown. The present disclosure should not be construed as limited to the embodiments set forth herein. Rather, these embodiments are provided so that this disclosure will be thorough and complete, and will fully convey the scope of the present disclosure to those skilled in the art.

In the entire specification, when an element is referred to as being "connected" or "coupled" to another element, it can be directly connected or coupled to the another element or be indirectly connected or coupled to the another element with one or more intervening elements interposed therebetween.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

As used herein, the singular forms are intended to include the plural forms as well, unless the context clearly indicates otherwise.

Figure 1:
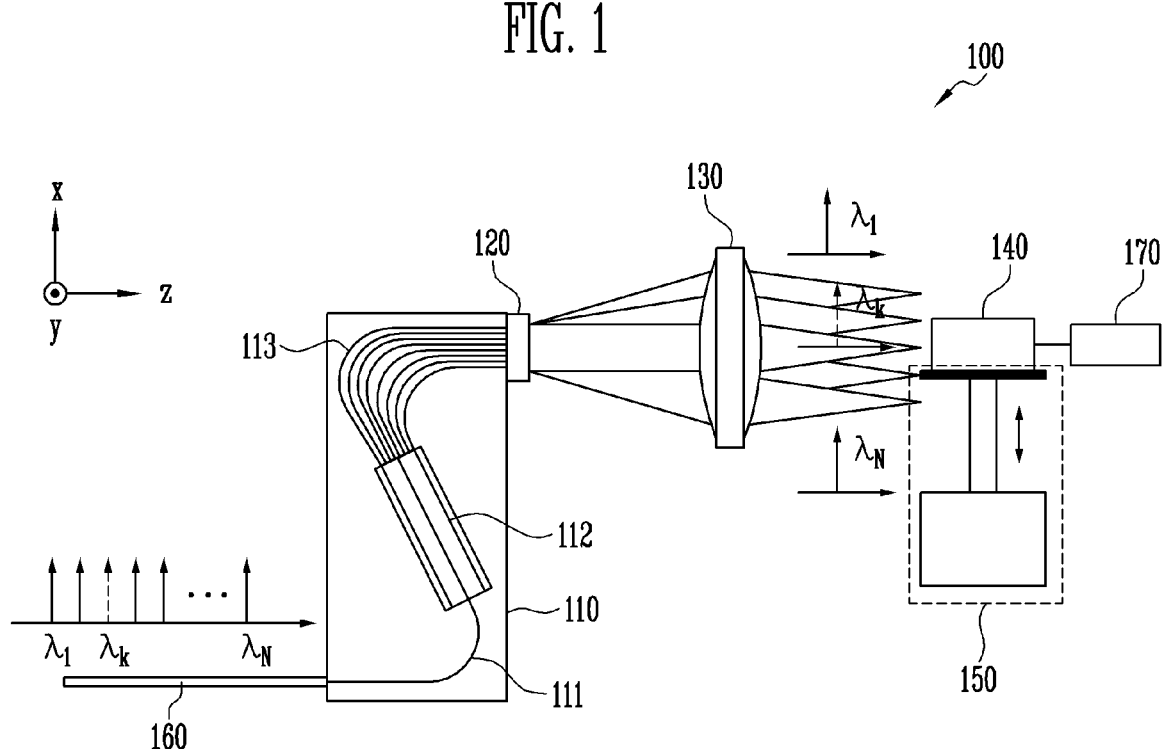
FIG. 1 is a view illustrating a structure of an optical signal processing apparatus according to a first embodiment of the present disclosure.

FIG. 1 is a view illustrating a structure of an optical signal processing apparatus according to a first embodiment of the present disclosure. In various embodiments of the present disclosure, the optical signal processing apparatus may be an optical channel monitor.

Referring to FIG. 1, the optical signal processing apparatus 100 may include a planar lightwave circuit (PLC) board 110, a cylinder lens 120, a condenser lens 130, a light receiving element 140, and a moving plate 150.

In various embodiments of the present disclosure, the PLC board 110 includes a waveguide-array structure. Specifically, a waveguide-array structure including an input waveguide 111, a slab waveguide 112, and an array waveguide 113 may be formed on the PLC board 110. The slab waveguide 112 may be called as a free space region (FSR). The slab waveguide 112 allows the intensity of an optical signal advancing therethrough to be spatially uniformly distributed. The array waveguide 113 includes a plurality of divided channel-type waveguides, and is designed such that adjacent waveguides have a predetermined optical path difference.

In an embodiment, the PLC board 110 may be made of a material such as silica, silicon, polymer, semiconductor or quartz. The waveguide-array structure may be formed on the board made of the material.

The optical signal processing apparatus 100 may receive a WDM optical signal input from an external optical fiber 160. To this end, a waveguide terminal connected to the input waveguide 111 may be formed at an edge of the PLC board 110 such that the input waveguide 111 can be connected to the external optical fiber 160. In addition, a plurality of waveguide terminals connected to the array waveguide 113 may be formed at an edge of the PLC board 110. As shown in FIG. 1, the cylinder lens 120 may be fixed to the plurality of waveguide terminals. The cylinder lens 120 functions to collimate optical signals emitted and output from the PLC board 110 into parallel beams.

If a WDM optical signal is input to the optical signal processing apparatus 100, the WDM optical signal first passes through the PLC board 110 having the waveguide-array structure formed thereon. While passing through the PLC board 110, the WDM optical signal undergoes different phase changes for every wavelength due to the waveguide-array structure. Accordingly, optical signals output (into a free space) from the PLC board 110 advance at different propagation angles for every wavelength. This will be described in detail as follows.

The waveguide-array structure formed on the PLC board 110 as described above includes the slab waveguide 112 and the array waveguide 113. A WMD optical signal input to the PLC board 110 has an intensity spatially uniformly distributed while advancing through the slab waveguide 112 and is then propagated into each of the channel-type waveguides constituting the array waveguide 113. The optical signal propagated into the array waveguide 113 is divided into a plurality of optical signals while advancing through the channel-type waveguides, and each of the optical signals has a predetermined phase difference from an adjacent optical signal. If the wavelength of the input optical signal is changed, the phase difference between adjacent optical signals is automatically changed by the channel-type waveguides. The phase difference between adjacent optical signals determines the propagation angle of an optical signal propagated into the free space. Therefore, if the wavelength of an optical signal is changed, the propagation angle of the optical signal is also changed.

As a result, the PLC board 110 having the waveguide-array structure formed thereon functions to change the propagation angle of an optical signal propagated from the PLC board 110 into the free space when the wavelength of the optical signal is changed similarly to that of diffraction grating.

As described above, the WDM optical signal input to the PLC board 110 is divided into optical signals having different propagation angles while passing through the PLC board 110 to be output toward a z-axis direction with respect to a section of the PLC board 110 at propagation angles based on different wavelengths. The output optical signals are collimated into parallel beams by passing through the cylinder lens 120, and the plurality of collimated optical signals are condensed for every channel at spatially different positions by the condenser lens 130. In an embodiment, the condenser lens 130 may be a biconvex lens, but the present disclosure is not limited thereto.

At least one optical signal (at least one channel) corresponding to the position of the light receiving element 140 among the condensed optical signals is input to the light receiving element 140. If the position of the light receiving element 140 is moved along the x-axis by the moving plate 150, the light receiving element 140 may sequentially/selectively receive the condensed optical signals for every channel. The moving plate 150 may include a linear motor or step motor to move the light receiving element 140 connected thereto.

Alternatively, in an embodiment, when the condenser lens 130 and the light receiving element 140 are fixed, the PLC board 110 and the cylinder lens 120 may be rotated together, so that the light receiving element 140 receives the condensed optical signals for every channel. Hereinafter, the optical signal processing apparatus 100 having a structure in which the PLC board 110 and the cylinder lens 120 are rotated will be described in detail with reference to FIG. 2.

The light receiving element 140 may convert the input optical signals of an arbitrary channel into electrical signals and propagate the electrical signals to a signal processor 170. When the optical signal processing apparatus 100 is an optical channel monitor, the signal processor 170 may monitor signal characteristics including an intensity, a wavelength, etc. with respect to the corresponding optical signal.

Figure 2:
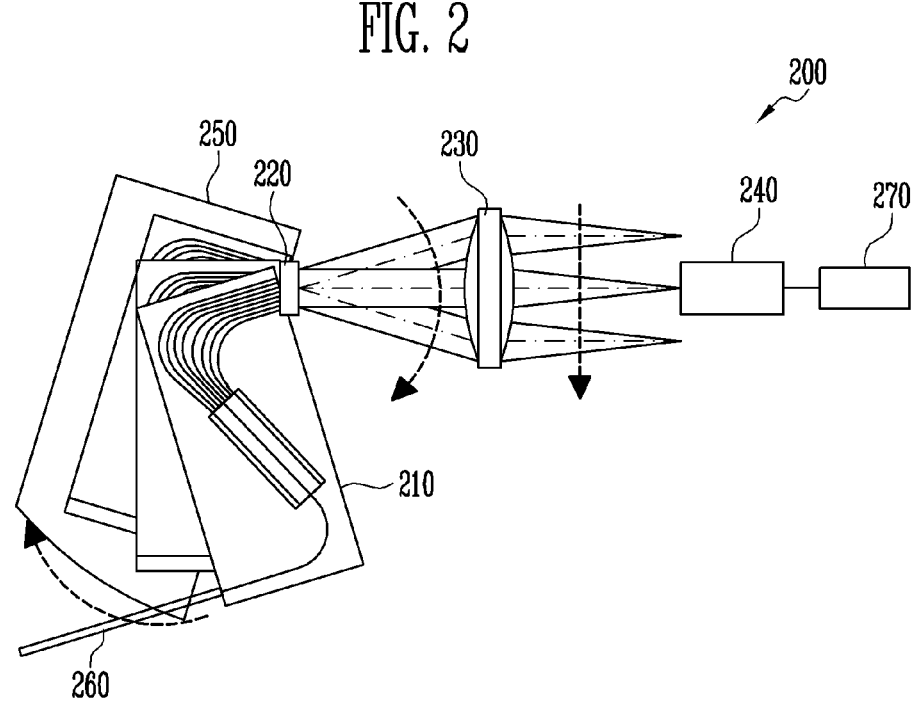
FIG. 2 is a view illustrating a structure of an optical signal processing apparatus according to a second embodiment of the present disclosure.

FIG. 2 is a view illustrating a structure of an optical signal processing apparatus according to a second embodiment of the present disclosure.

Unlike the first embodiment of FIG. 1, the optical signal processing apparatus 200 according to the second embodiment of the present disclosure does not include the moving plate 150. That is, a condenser lens 230 and a light receiving element 240 are fixed in the optical signal processing apparatus 200 of FIG. 2. Instead, in order to for the light receiving element 240 to receive condensed optical signals of a specific channel, the optical signal processing apparatus 200 according to the second embodiment of the present disclosure is configured such that a PLC board 210 is rotatable.

In an embodiment, the PLC board 210 is provided on a rotating plate 250. As the rotating plate 250 rotates, the PLC board 210 fixed on the rotating plate 250 and a cylinder lens 220 fixed to the PLC board 210 are rotated together.

Operations of other components in the optical signal processing apparatus 200 according to the second embodiment are identical to those described in the first embodiment, and WDM optical signals are propagated to the light receiving element 240 according to the same operating principle as described in FIG. 1. The light receiving element 240 receives optical signals condensed on a specific channel according to a rotational angle of the rotating plate 250. In this case, the rotational angle of the PLC board 210 and the cylinder lens 220, i.e., the rotational angle of the rotating plate 250 may correspond to each channel of optical signals input to the light receiving element 240, i.e., each channel to be monitored by a signal processor 270.

Figure 3:
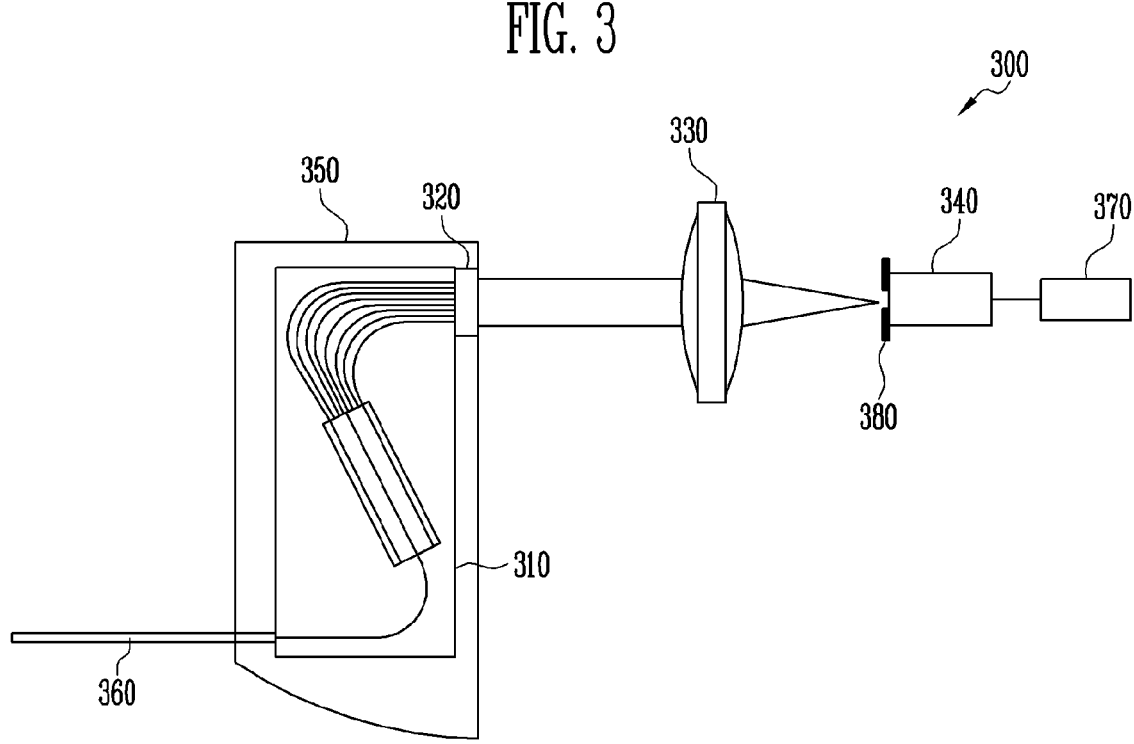
FIG. 3 is a view illustrating a structure of an optical signal processing apparatus according to a third embodiment of the present disclosure.

FIG. 3 is a view illustrating a structure of an optical signal processing apparatus according to a third embodiment of the present disclosure.

The optical signal processing apparatus 300 according to the third embodiment of the present disclosure further includes a slit mask 380, as compared with the first embodiment of FIG. 1 and the second embodiment of FIG. 2. The slit mask 380 is provided at the front end of a light receiving element 340 so as to control wavelength bandwidths of optical signals input to the light receiving element 340.

Figure 4:
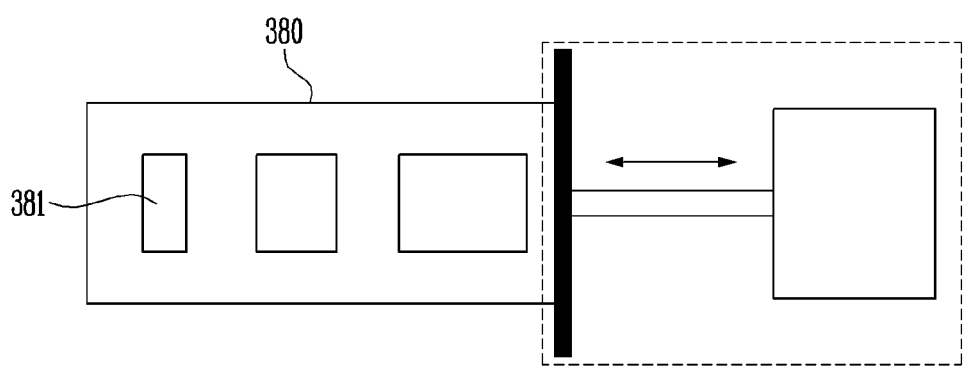
FIG. 4 is a view illustrating an example of a slit mask in the optical signal processing apparatus according to the third embodiment of the present disclosure.

To this end, the slit mask 380, as shown in FIG. 4, may have a structure including a plurality of slits 381 with various slit sizes. The slit mask 380 is provided to be movable at the front end of the light receiving element 340. As the slit mask 380 moves, any one of the plurality of slit 381 is located corresponding to the light receiving element 340, and the wavelength bandwidth of the optical signal input to the light receiving element 340 are determined according to a size of the slit corresponding to the light receiving element.

The wavelength bandwidth of the optical signal input to the light receiving element 340 increases in proportion to the size of the plurality of slits 381 constituting the slit mask 380. Thus, if the wavelength bandwidth of an optical signal (channel) to be input to the light receiving element 340, i.e., an optical signal (channel) to be monitored, is determined, the slit mask 380 is designed to have a suitable size corresponding to the determined wavelength bandwidth, thereby controlling the wavelength bandwidth.

Figure 5:
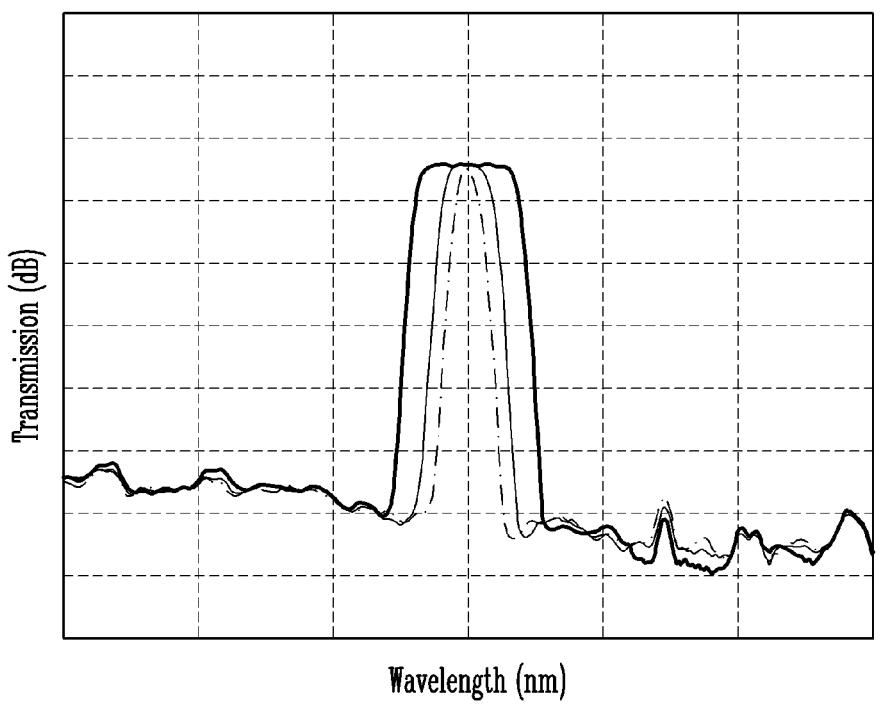
FIG. 5 is a graph illustrating a change in wavelength bandwidth of an optical signal input to a light receiving element based on a slit size of the slit mask in the optical signal processing apparatus according to the third embodiment of the present disclosure.

FIG. 5 is a graph illustrating a change in wavelength bandwidth of an optical signal input to the light receiving element 340 based on a slit size of the slit mask 380 in the optical signal processing apparatus 300 according to the third embodiment of the present disclosure. Referring to FIG. 5, it can be seen that as the slit size increases, the wavelength bandwidth of the optical signal input to the light receiving element 340 increases.

Figure 6:
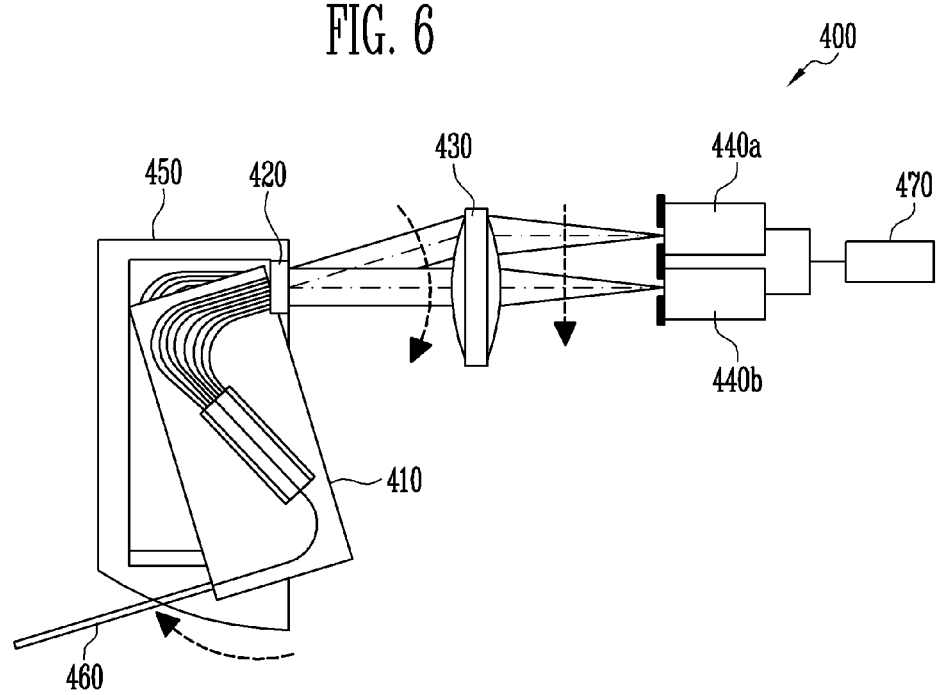
FIG. 6 is a view illustrating a structure of an optical signal processing apparatus according to a fourth embodiment of the present disclosure.

FIG. 6 is a view illustrating a structure of an optical signal processing apparatus according to a fourth embodiment of the present disclosure.

The optical signal processing apparatus 400 according to the fourth embodiment of the present disclosure includes a plurality of light receiving elements 440a and 440b, as compared with the third embodiment of FIG. 3. The number of light receiving elements may correspond to the number of slits provided in a slit mask 480. In FIG. 6, a case where the optical signal processing apparatus 400 includes two light receiving elements 440a and 440b is illustrated as an example. The plurality of light receiving elements 440a and 440b may be arranged in a line perpendicular to the advancing direction of optical signals passing through a condenser lens 430. The slit mask 480 may be provided at the front end of the plurality of light receiving elements 440a and 440b such that a plurality of slits provided in the slit mask 480 correspond to the respective light receiving elements 440a and 440b.

Figure 7:
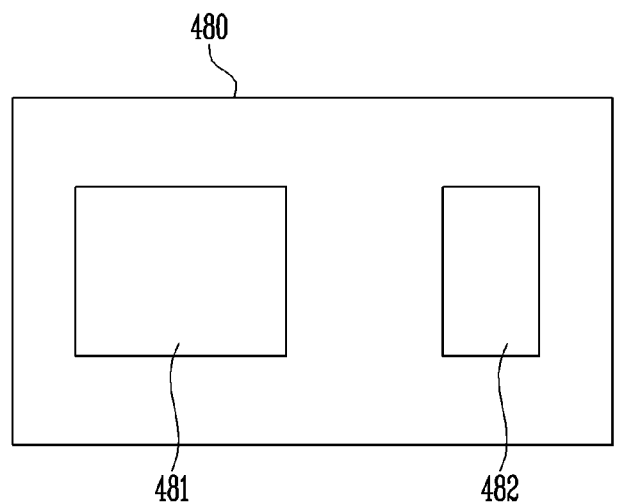
FIG. 7 is a view illustrating an example of a slit mask in the optical signal processing apparatus according to the fourth embodiment of the present disclosure.

The slit mask 480, as shown in FIG. 7, may have a structure including a plurality of slits 481 and 482 with various slit sizes. Accordingly, the plurality of light receiving elements 440a and 440b receive optical signals having different wavelength bandwidths.

Figure 8:
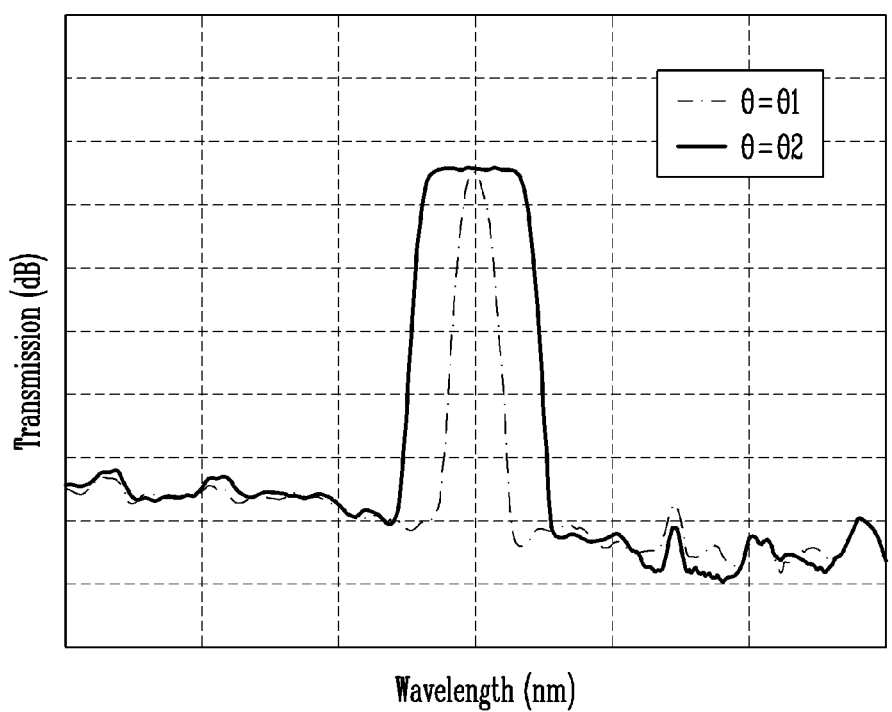
FIG. 8 is a graph illustrating a change in wavelength bandwidth of an optical signal input to a light receiving element based on a slit size of the slit mask in the optical signal processing apparatus according to the fourth embodiment of the present disclosure.

FIG. 8 is a graph illustrating a change in wavelength bandwidth of an optical signal input to the plurality light receiving elements 440a and 440b based on a slit size of the slit mask 480 in the optical signal processing apparatus 400 according to the fourth embodiment of the present disclosure. Referring to FIG. 8, it can be seen that optical signals input to the plurality of light receiving elements 440a and 440b have different wavelength bandwidths. As a result, a signal processor 470 can simultaneously monitor WDM optical signals having different wavelength bandwidths through the plurality of light receiving elements 440a and 440b.

According to the present disclosure, the optical signal processing apparatus can implement an optical channel monitor which is easily manufactured and assembled using general-purpose techniques and realizes simplification, miniaturization, and low price.

Also, the optical signal processing apparatus can solve the problem in that major companies securing highly accurate techniques exclusively supply optical channel monitors due to the typically complex technical basis. In addition, the optical signal processing apparatus can remarkably improve the marketability and price competitiveness of optical channel monitors.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An optical signal processing apparatus, comprising:
    a planar lightwave circuit (PLC) board including a waveguide-array structure;
    a cylinder lens configured to collimate optical signals emitted and output from the PLC board into parallel beams defining a plurality of channels;
    a condenser lens configured to condense, for each channel, optical signals passing through the cylinder lens;
    a light receiving element configured to receive optical signals condensed on at least one channel from the condenser lens and convert the optical signals into electrical signals; and
    a motor configured to move one of the PLC board or the light receiving element relative to the other of the PLC board or the light receiving element,
    wherein the PLC board divides an optical signal input thereto into a plurality of different optical signals and outputs the optical signals at different propagation angles, and
    wherein the condenser lens is configured to output the plurality of channels having optical axes spaced apart from each other, such that moving, by the motor, the PLC board or the light receiving element to a first position of the PLC board relative to the light receiving element directs one channel among the plurality of channels toward the light receiving element to be detected by the light receiving element, and moving, by the motor, the PLC board or the light receiving element to another position of the PLC board relative to the light receiving element directs another channel among the plurality of channels toward the light receiving element.

2. The optical signal processing apparatus of claim 1, wherein the PLC board includes:
an input waveguide connected to an external optical fiber;
a slab waveguide configured to spatially uniformly distribute the intensity of an optical signal; and
an array waveguide including a plurality of divided channel-type waveguides, and allow optical signals to be output with a predetermined difference in propagation angle between adjacent waveguides.

3. The optical signal processing apparatus of claim 1, wherein the PLC board is made of any one of silica, silicon, polymer, semiconductor, and quartz.

4. The optical signal processing apparatus of claim 1, wherein the condenser lens is a biconvex lens.

5. The optical signal processing apparatus of claim 1, further comprising a moving plate configured to move the light receiving element in a direction perpendicular to an optical axis of the condenser lens, such that a first position of the light receiving element corresponds to a position of a first channel and a second position of the light receiving element in the direction perpendicular to the optical axis of the condenser lens corresponds to a position of a second channel.

6. The optical signal processing apparatus of claim 5, wherein the moving plate includes a linear motor or step motor.

7. The optical signal processing apparatus of claim 1, further comprising at least one slit mask provided at a front end of the light receiving element, the at least one slit mask including at least one slit to control wavelength bandwidths of optical signals input to the light receiving element.

8. The optical signal processing apparatus of claim 7, wherein the at least one slit includes a plurality of slits having different sizes.

9. The optical signal processing apparatus of claim 8, wherein the slit mask is provided to be movable, and allows any one of the plurality of slits to be located corresponding to the light receiving element to allow an optical signal to pass through the one of the plurality of slits to the light receiving element.

10. The optical signal processing apparatus of claim 8, wherein the light receiving element includes a plurality of light receiving elements, and
the plurality of slits are located respectively corresponding to the plurality of light receiving elements, such that optical signals of different channels are allowed to pass through different slits among the plurality of slits to different light receiving elements of the plurality of light receiving elements.

11. The optical signal processing apparatus of claim 1, further comprising a signal processor configured to receive the converted electrical signals from the light receiving element, thereby monitoring signal characteristics.

12. The optical signal processing apparatus of claim 11, wherein the signal characteristics include at least one of an intensity and a wavelength.

13. The optical signal processing apparatus of claim 1, wherein the motor is connected to the PLC board to rotate the PLC board relative to the light receiving element.

\* \* \* \* \*